(12) United States Patent
Reski

(10) Patent No.: US 11,814,807 B1
(45) Date of Patent: Nov. 14, 2023

(54) BALLAST TRAY ASSEMBLY FOR A TOWER STRUCTURE

(71) Applicant: Great Plains Towers, Inc., West Fargo, ND (US)

(72) Inventor: Kevin Reski, West Fargo, ND (US)

(73) Assignee: Great Plains Tower Products LLC, Fargo, ND (US)

( * ) Notice: Subject to any disclaimer, the term of this patent is extended or adjusted under 35 U.S.C. 154(b) by 0 days.

(21) Appl. No.: 18/046,313

(22) Filed: Oct. 13, 2022

(51) Int. Cl.
*E02D 27/42* (2006.01)
*E04H 12/22* (2006.01)
*F16M 5/00* (2006.01)

(52) U.S. Cl.
CPC ......... *E02D 27/42* (2013.01); *E04H 12/2246* (2013.01); *F16M 5/00* (2013.01)

(58) Field of Classification Search
CPC ....... E02D 27/42; E02D 27/32; E02D 27/013; E02D 27/08; E04H 12/2246; E04H 12/2238; E04H 17/009; F16M 5/00; H01Q 1/1207; H01Q 1/246; B01F 35/42; B44D 3/14
USPC ......................................................... 248/678
See application file for complete search history.

(56) References Cited

U.S. PATENT DOCUMENTS

| | | | | |
|---|---|---|---|---|
| 1,586,085 A | * | 5/1926 | Hill | E02D 27/42 52/294 |
| 1,796,720 A | * | 3/1931 | Porter | E02D 27/42 52/166 |
| 2,036,047 A | * | 3/1936 | Hill | E02D 27/42 52/166 |
| 2,828,931 A | * | 4/1958 | Harvey | F16M 3/00 52/143 |
| 2,882,810 A | * | 4/1959 | Goettl | F16M 5/00 248/237 |
| 3,022,028 A | * | 2/1962 | Reinhard | F16M 5/00 52/645 |
| 3,119,588 A | * | 1/1964 | Keats | E01F 9/688 40/607.04 |
| 3,477,668 A | * | 11/1969 | Tippmann | F16M 5/00 248/346.03 |
| 4,185,288 A | * | 1/1980 | Dosch | H01Q 3/08 343/765 |

(Continued)

FOREIGN PATENT DOCUMENTS

| | | | | | |
|---|---|---|---|---|---|
| CN | 104944300 A | * | 9/2015 | | |
| CN | 105569054 A | * | 5/2016 | ............. | E02D 17/04 |

(Continued)

*Primary Examiner* — Taylor Morris
(74) *Attorney, Agent, or Firm* — Fargo Patent & Business Law; Thomas Kading

(57) ABSTRACT

A ballast tray assembly includes a first side-beam; a second side-beam parallel to the first side-beam; a first cross-beam between the first side-beam and the second side-beam; a second cross-beam between the first side-beam and the second side-beam; a third cross-beam between the first side-beam and the second side-beam; a fourth cross-beam between the first side-beam and the second side-beam; a first interface beam and a second interface beam parallel to the first side-beam and the second side-beam between the second cross-beam and the third cross-beam to provide a support interface; and an interface plate attachable to the support interface.

19 Claims, 11 Drawing Sheets

(56) References Cited

U.S. PATENT DOCUMENTS

| | | | | |
|---|---|---|---|---|
| 4,191,356 A * | 3/1980 | Ashmun | F01D 25/28 | 184/6 |
| 4,649,675 A * | 3/1987 | Moldovan | E04H 3/00 | 52/27 |
| 4,660,799 A * | 4/1987 | Butland | A61B 6/4405 | 248/676 |
| 4,785,593 A * | 11/1988 | Munoz, Jr. | E02D 27/42 | 52/298 |
| 5,142,293 A * | 8/1992 | Ross | H01Q 1/1221 | 343/878 |
| 5,149,050 A * | 9/1992 | Smith | F16M 5/00 | 248/680 |
| 5,257,489 A * | 11/1993 | Angelette | E02D 27/42 | 52/741.15 |
| 5,297,770 A * | 3/1994 | Drexel | F16M 5/00 | 248/638 |
| 5,531,419 A * | 7/1996 | Gustafsson | E04H 12/187 | 343/882 |
| 5,878,540 A * | 3/1999 | Morstein | E02D 27/42 | 52/292 |
| 6,058,299 A * | 5/2000 | Lyseng | H04B 1/38 | 455/347 |
| 6,095,482 A * | 8/2000 | LaGrotta | H02B 1/50 | 108/51.11 |
| 6,199,818 B1 * | 3/2001 | Tsappi | A01G 9/124 | 248/524 |
| 6,266,938 B1 * | 7/2001 | Sheu | E04B 5/14 | 248/676 |
| 6,464,196 B1 * | 10/2002 | Crookham | E04H 12/10 | 248/519 |
| 6,798,387 B2 * | 9/2004 | Cockell | H01Q 19/13 | 343/890 |
| 6,820,389 B1 * | 11/2004 | Macchietto | E04H 12/2261 | 248/156 |
| 6,889,953 B2 * | 5/2005 | Harbaugh | E04H 12/2246 | 248/539 |
| 6,981,685 B1 * | 1/2006 | McHugh | F16M 5/00 | 248/188.1 |
| 7,098,864 B2 * | 8/2006 | Ryan | H01Q 9/34 | 343/890 |
| 7,191,792 B2 * | 3/2007 | Hendrix | F04B 35/06 | 248/346.5 |
| 8,056,299 B2 * | 11/2011 | Liskey | E04C 3/34 | 52/125.2 |
| 8,319,697 B2 * | 11/2012 | Conrad | H01Q 19/12 | 343/878 |
| 8,333,500 B1 * | 12/2012 | Melvin | E04D 15/00 | 366/348 |
| 8,695,305 B2 * | 4/2014 | Gallagher | E04H 12/2238 | 52/656.9 |
| 9,499,954 B2 * | 11/2016 | Shi | E02D 27/02 | |
| 9,540,840 B2 * | 1/2017 | Ma | F16M 13/00 | |
| 9,669,369 B1 * | 6/2017 | Mees | B01F 35/43 | |
| 9,863,161 B2 * | 1/2018 | Anderson | E02D 27/42 | |
| 10,125,506 B2 * | 11/2018 | Cusson | E02D 27/08 | |
| 10,378,231 B2 * | 8/2019 | Sharpe | E04H 12/2238 | |
| 10,501,957 B1 * | 12/2019 | Borowiak | E02D 27/42 | |
| 10,813,425 B2 * | 10/2020 | Shen | E04H 12/2238 | |
| 11,146,866 B2 * | 10/2021 | Hon | H04Q 1/09 | |
| 11,242,694 B2 * | 2/2022 | Bucarizza | E01F 13/02 | |
| 2012/0131879 A1 * | 5/2012 | Bergman | E04F 11/1812 | 52/704 |
| 2014/0059957 A1 * | 3/2014 | Stark | E02D 27/42 | 52/292 |
| 2015/0308140 A1 * | 10/2015 | Clifton | E02D 27/425 | 248/346.2 |
| 2015/0323124 A1 * | 11/2015 | Erdos | F16M 11/38 | 211/13.1 |
| 2023/0094617 A1 * | 3/2023 | Clark | E02D 27/32 | 29/402.08 |

FOREIGN PATENT DOCUMENTS

| | | | |
|---|---|---|---|
| CN | 111877390 A * | 11/2020 | |
| CN | 112227411 A * | 1/2021 | E02D 27/01 |
| DE | 10316029 B3 * | 8/2004 | F16M 5/00 |
| DE | 102022106027 A1 * | 9/2022 | E02D 27/016 |
| EP | 3342305 A1 * | 7/2018 | E04H 12/2238 |
| ES | 2307348 A1 * | 11/2008 | E02D 27/42 |
| FR | 2811359 A3 * | 1/2002 | E04H 12/2246 |
| FR | 3127969 A1 * | 4/2023 | E04H 12/2246 |

* cited by examiner

BALLAST TRAY FOR GPT 30' 60" SQ. TUBING + 4' TOP PIPE
(ANALYSIS PER TIA-222-G)

BASE REACTIONS $V = 0.57$ KIP $H = 1.9$ KIP $M = 38.5$ KIP-FT

BALLAST TRAY (1900#)
8'- 6" x 8'- 6" x 1'- 4" TALL

CHECK FOR OVERTURNING @ A $M_R = (1.90 + 0.57 + 12.5)(4.25) = 63.6$ K-FT $M_{O_A} = 38.5 + (1.9)(1.33) = 41.0$ K-FT $M_R/M_O = (63.6)/(41.0) = 1.55$ ∴ OK

WELDED BALLAST TRAY CONTAINS 3.1 CU YD
(12,500#) OF CONCRETE IN BALLAST TRAY

CHECK FOR SLIDING $u = .3$ $F_{SL} = (0.3)(1.9 + 0.57 + 12.5) = 4.49$ KIP 4.49 KIP > 1.9 KIP ∴ ok

FIG. 13

BALLAST TRAY ASSEMBLY FOR A TOWER STRUCTURE

BACKGROUND

The present disclosure relates to tower structures, and more particularly to a ballast tray assembly thereof.

Equipment such as antennas, cameras, and the like are often mounted on tower structures to provide optimal operating positions. The towers are often mounted on a ballast tray assembly which supports the tower without having to install a pier in the ground. High wind conditions are a significant concern for all such towers.

SUMMARY

A ballast tray assembly according to one disclosed non-limiting embodiment of the present disclosure includes a first side-beam; a second side-beam parallel to the first side-beam; a first cross-beam between the first side-beam and the second side-beam; a second cross-beam between the first side-beam and the second side-beam; a third cross-beam between the first side-beam and the second side-beam; a fourth cross-beam between the first side-beam and the second side-beam; a first interface beam and a second interface beam parallel to the first side-beam and the second side-beam between the second cross-beam and the third cross-beam to provide a support interface; and an interface plate attachable to the support interface.

A further embodiment of any of the foregoing embodiments of the present disclosure in which the first cross-beam, the second cross-beam, the third cross-beam, and the fourth cross-beam each include profiled ends to interface with the first side-beam and the second side-beam.

A further embodiment of any of the foregoing embodiments of the present disclosure in which the first cross-beam, the second cross-beam, the third cross-beam, and the fourth cross-beam each include profiled ends to interface with the first side-beam and the second side-beam to facilitate welding therebetween.

A further embodiment of any of the foregoing embodiments of the present disclosure in which the ballast tray assembly is 8.5 feet by 8.5 feet and 1 foot 4 inches tall.

A further embodiment of any of the foregoing embodiments of the present disclosure includes wherein the interface plate is attachable to the support interface via an interface plate aperture arrangement and a ballast tray assembly aperture arrangement around the support interface.

A further embodiment of any of the foregoing embodiments of the present disclosure in which the interface plate is attachable to the support interface via an interface plate aperture arrangement and a ballast tray assembly aperture arrangement around the support interface via a multiple of fasteners.

A further embodiment of any of the foregoing embodiments of the present disclosure in which the ballast tray assembly forms a rectilinear arrangement 40 with seven compartments.

A further embodiment of any of the foregoing embodiments of the present disclosure in which each of the seven compartments comprise a drain hole through subfloor.

A further embodiment of any of the foregoing embodiments of the present disclosure in which the interface plate comprises a mount aperture arrangement specific to that which is to be mounted to the interface plate.

A further embodiment of any of the foregoing embodiments of the present disclosure in which the interface plate comprises a central aperture located at the center of the interface plate.

A further embodiment of any of the foregoing embodiments of the present disclosure in which the central aperture is sized to receive a container.

A further embodiment of any of the foregoing embodiments of the present disclosure in which the central aperture is sized to receive a bucket.

A ballast tray assembly according to one disclosed non-limiting embodiment of the present disclosure includes a first side-beam; a second side-beam parallel to the first side-beam; a first cross-beam welded between the first side-beam and the second side-beam; a second cross-beam welded between the first side-beam and the second side-beam; a third cross-beam welded between the first side-beam and the second side-beam; a fourth cross-beam welded between the first side-beam and the second side-beam; a first interface beam and a second interface beam parallel to the first side-beam and the second side-beam welded between the second cross-beam and the third cross-beam to provide a support interface; an interface plate attachable to the support interface, the interface plate comprises a central aperture located at the center of the interface plate; and a bucket within the central aperture.

A further embodiment of any of the foregoing embodiments of the present disclosure in which the interface plate comprises a mount aperture arrangement specific to that which is to be mounted to the interface plate.

A further embodiment of any of the foregoing embodiments of the present disclosure in which the interface plate comprises a central aperture located at the center of the interface plate.

A further embodiment of any of the foregoing embodiments of the present disclosure in which the interface plate is welded to the support interface The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 13 is a mathematical representation of the ballast tray resistance to overturning and sliding according to a disclosed non-limiting embodiment.

DETAILED DESCRIPTION

Figure 1:
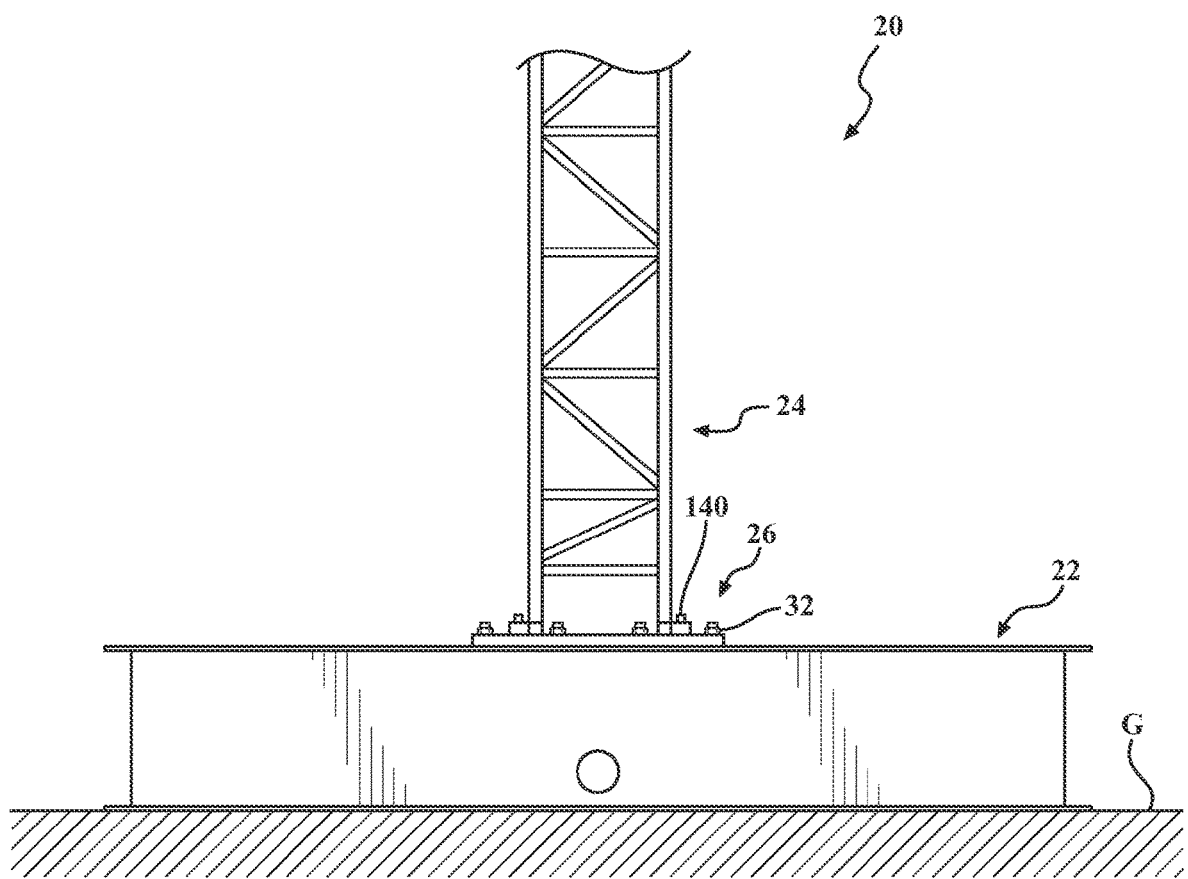
FIG. 1 is a schematic side view of a tower structure according to one disclosed non-limiting embodiment.

FIG. 1 schematically illustrates a tower structure 20 that is utilized to erect various instruments. The tower structure 20 generally includes a ballast tray 22 that is located on the ground G to support a lattice tower 24 via an interface plate 26. The ballast tray 22 in this embodiment is 8.5 feet by 8.5 feet and 16 inches tall. The ballast tray 22 is typically filled with a concrete material, in one example, 12,500 pounds of concrete within a 1,900 pound ballast tray 22, to provides a stable base for the lattice tower 24 which is mounted thereto via the interface plate 26. Although the lattice tower 24 is illustrated in this disclosed embodiment, the interface plate 26 may provide an interface for various other poles, towers, etc.

Figure 2:
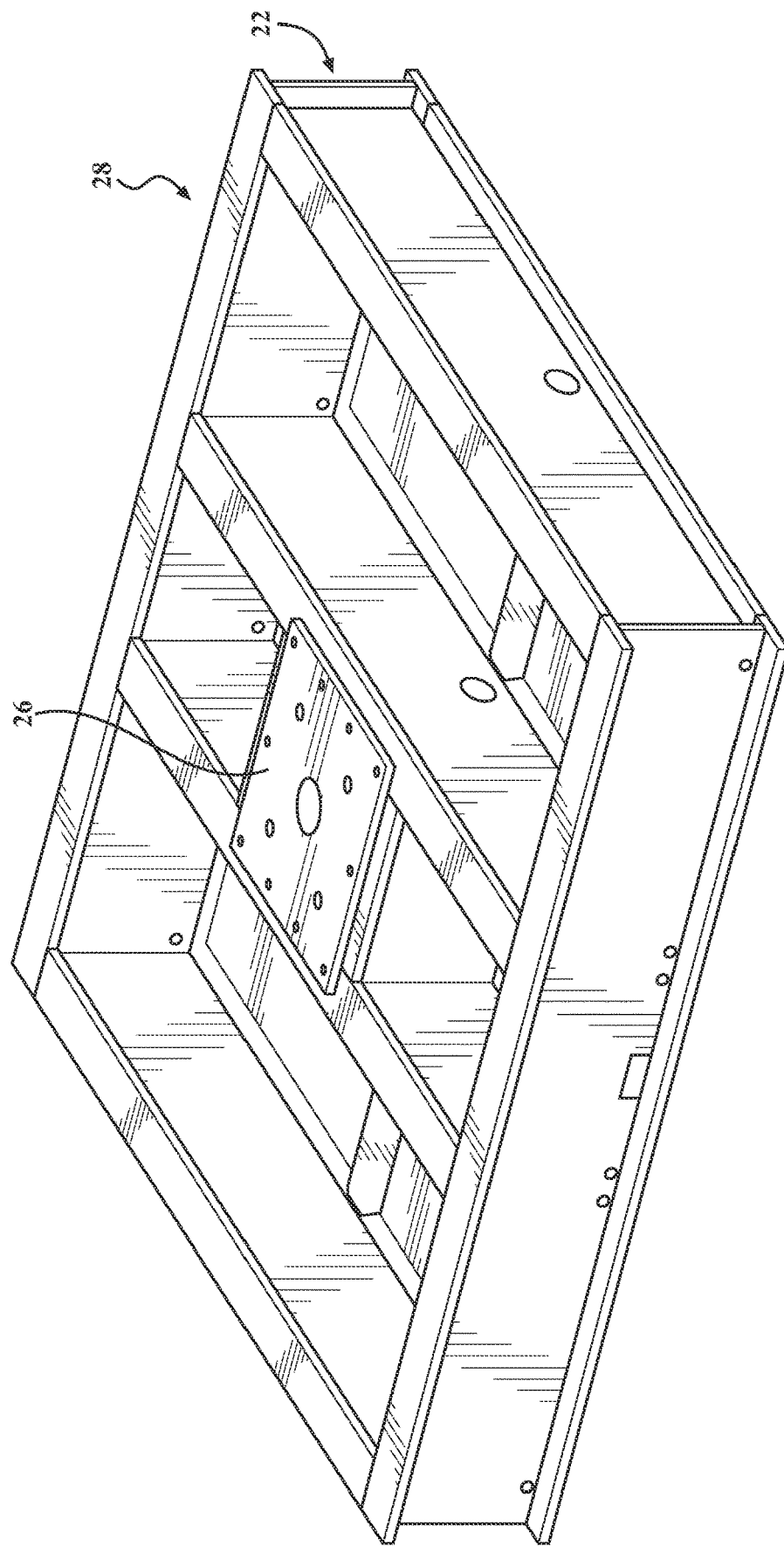
FIG. 2 is a perspective view of a ballast tray assembly according to a disclosed non-limiting embodiment.
Figure 3:
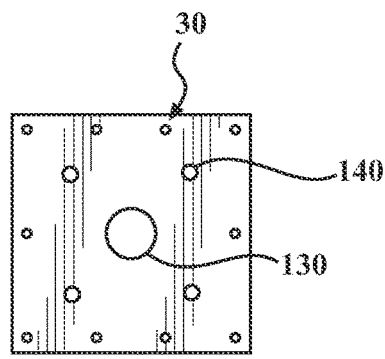
FIG. 3 is an expanded top view of an interface plate according to a disclosed non-limiting embodiment.

With reference to FIG. 2, the ballast tray 22 is a common component which is individualized by attachment of one of a multiple different interface plates 26, each of which provide the mounting arrangement for that which is supported by a ballast tray assembly 28. That is, the interface plate 26 includes an interface plate aperture arrangement 30 (FIG. 3) which corresponds with a ballast tray assembly aperture arrangement 32 (FIG. 4) On the ballast tray 22 but also includes a mount aperture arrangement 140 (FIG. 3) which is specific to a lattice tower which is mounted to the interface plate. Alternatively, the interface plate 26 may be welded to the ballast tray 22.

Figure 4:
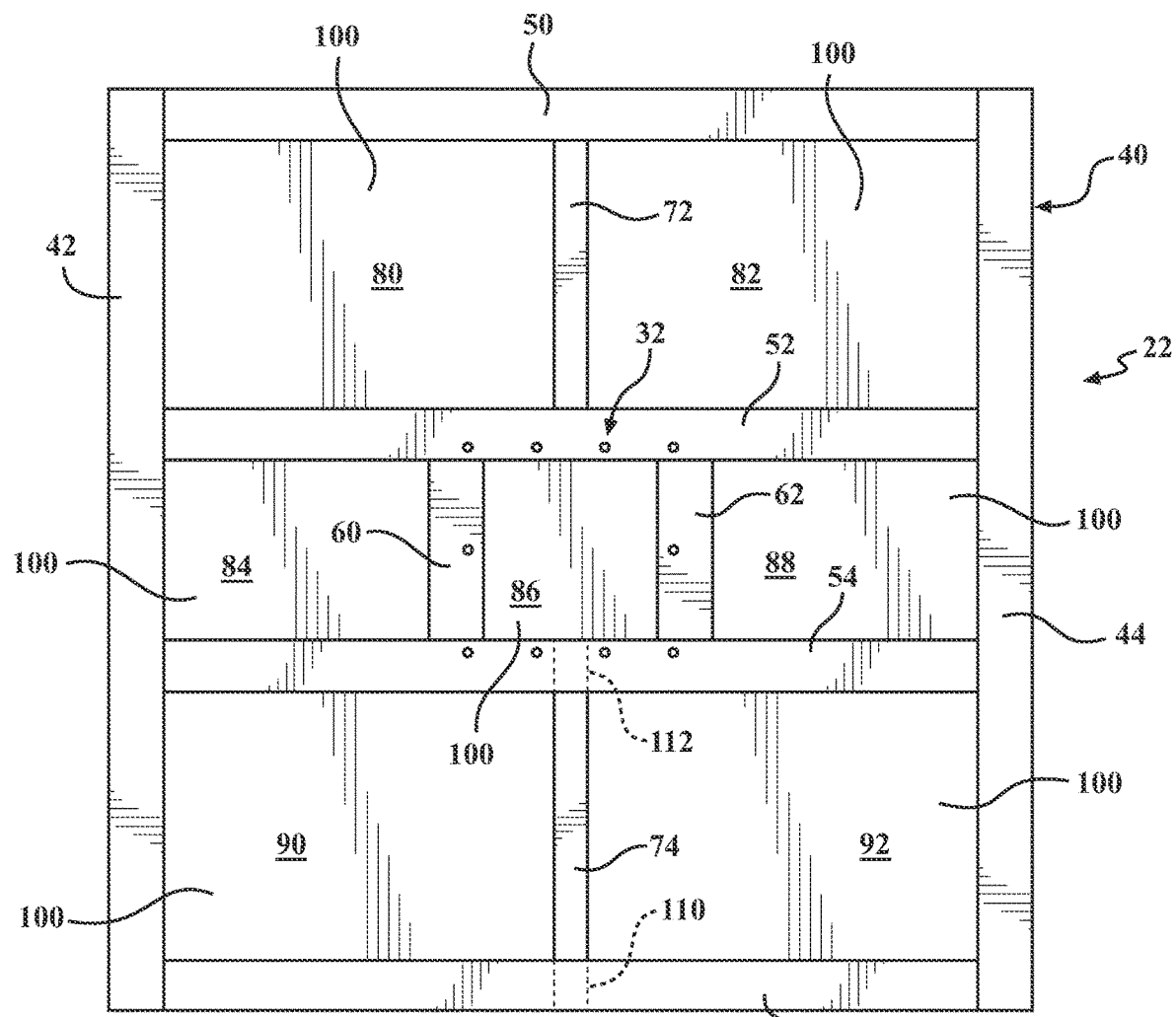
FIG. 4 is a top view of a ballast tray assembly according to a disclosed non-limiting embodiment.
Figure 5:
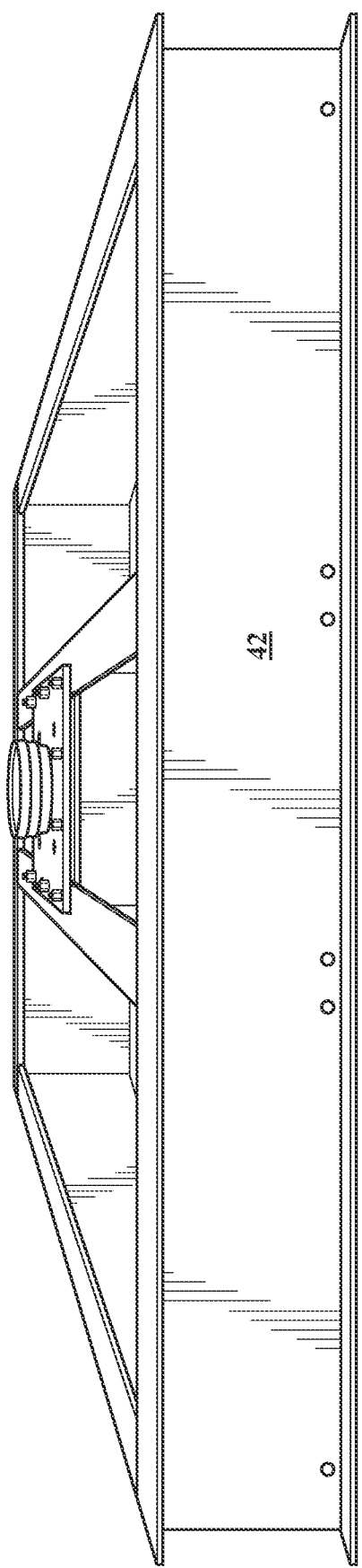
FIG. 5 is a front view of a ballast tray assembly.
Figure 6:
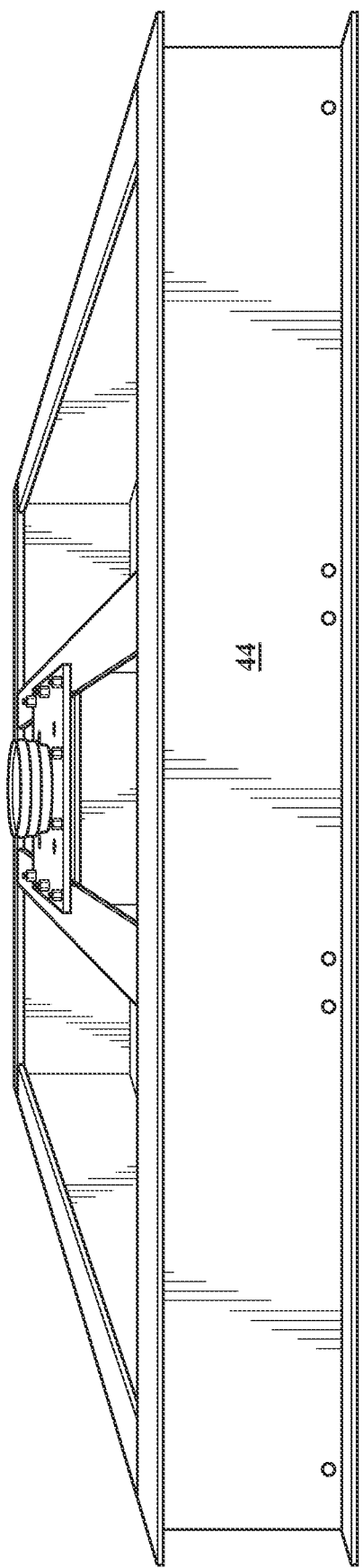
FIG. 6 is a rear view of a ballast tray assembly.
Figure 7:
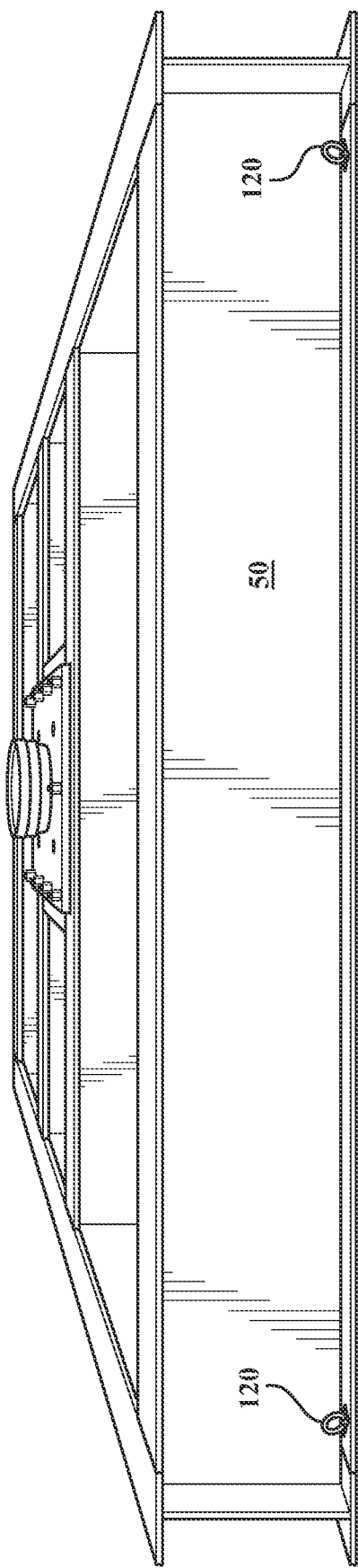
FIG. 7 is a first side view of a ballast tray assembly.
Figure 8:
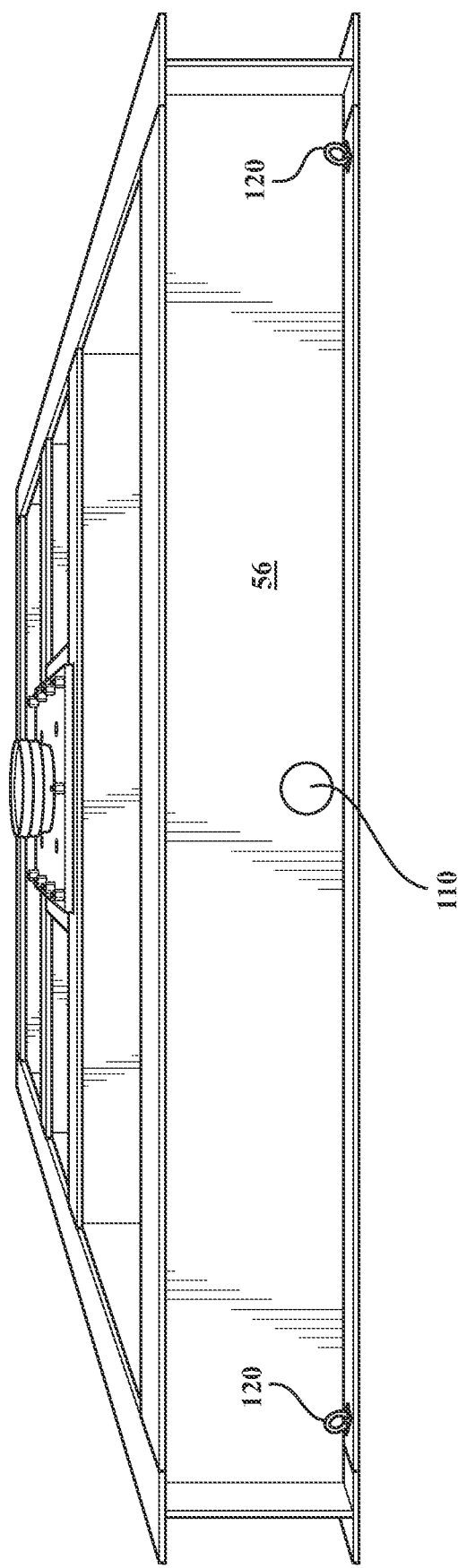
FIG. 8 is a second side view of a ballast tray assembly.
Figure 9:
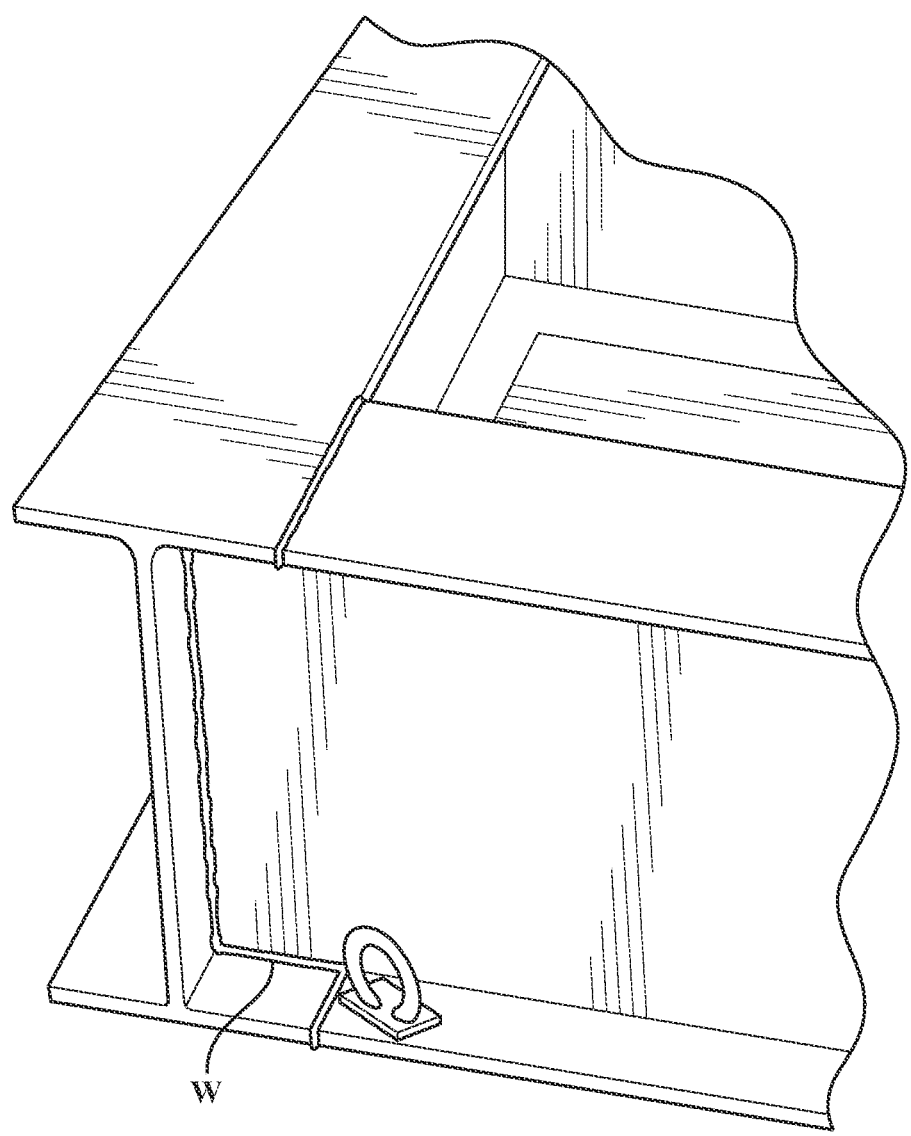
FIG. 9 is a corner perspective view of a ballast tray assembly showing a weld.

With reference to FIG. 4, the ballast tray 22 is typically manufactured primarily of metallic materials such as steel I-beams which are welded together in a rectilinear arrangement 40 of I-beams. A first side-beam 42 (FIG. 5) and a second side-beam 44 (FIG. 6) sandwich a first cross-beam 50 (FIG. 7), a second cross-beam 52, a third cross-beam 54, and a fourth cross-beam 56 (FIG. 8) therebetween. The first cross-beam 50, the second cross-beam 52, the third cross-beam 54, and the fourth 56 cross-beam may include profiled ends to interface with the first side-beam 42 and the second side-beam 44 to facilitate welding W (FIG. 9) therebetween. A first interface beam 60 and a second interface beam 62 are parallel to the first side beam 42 and the second side-beam 44 between the second cross-beam 52 and the third cross-beam 54 to provide a support interface for the interface plate 26.

Figure 10:
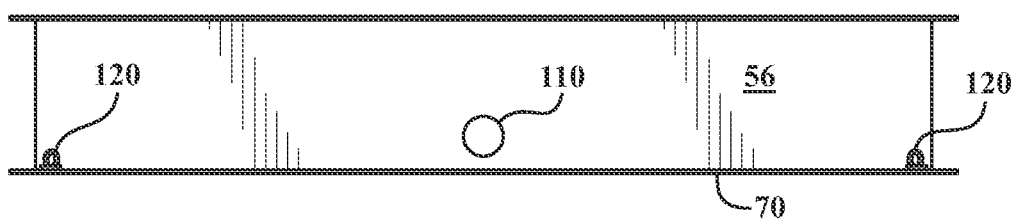
FIG. 10 is a side view of a ballast tray assembly according to a disclosed non-limiting embodiment.
Figure 11:
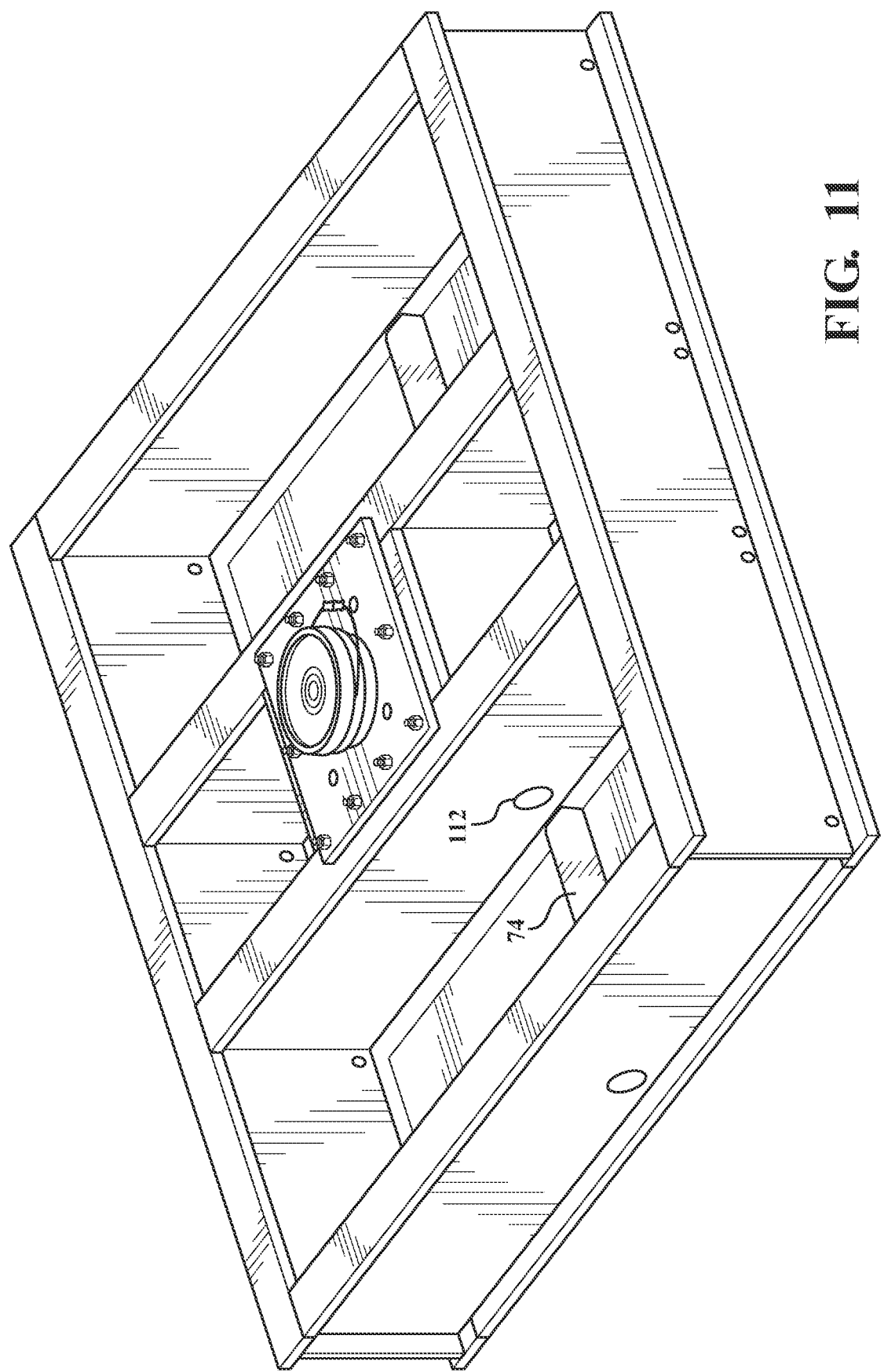
FIG. 11 is a top perspective view of a ballast tray assembly according to a disclosed non-limiting embodiment.

A sub floor 70 (FIG. 10) and floor supports 72, 74 (also shown in FIG. 11) are welded to the rectilinear arrangement 40 to receive the concrete. The rectilinear arrangement 40 in this embodiment forms seven compartments 80, 82, 84, 86, 88, 90, 92, each of which may include a drain hole 100. The floor supports 72, 74 are parallel to the first side-beam 42 and the second side-beam 44 and are defined along an axis A that passes through a center B of the ballast tray 22.

A first routing aperture 110 (FIGS. 8 and 10), and a second routing aperture 112, (FIG. 11) may be respectively located though the fourth cross-beam 56 and the third cross-beam 54, to provide for cable routing. The first and second routing aperture 110, 112, may, for example, be 4 inches in diameter to receive a pipe such as a PVC pipe. The first and second routing aperture 110, 112, provide a cable path to the center compartment 86 for routing cable, wires, etc. to the equipment on the lattice tower 24 or that which is supported by the ballast tray 22.

A pad eye 120 may be mounted adjacent each corner of the ballast tray 22 such as on the first cross-beam 50 and the fourth cross-beam 56. The pad eyes 120 provide for convenient integral lifting of the ballast tray 22.

Figure 12:
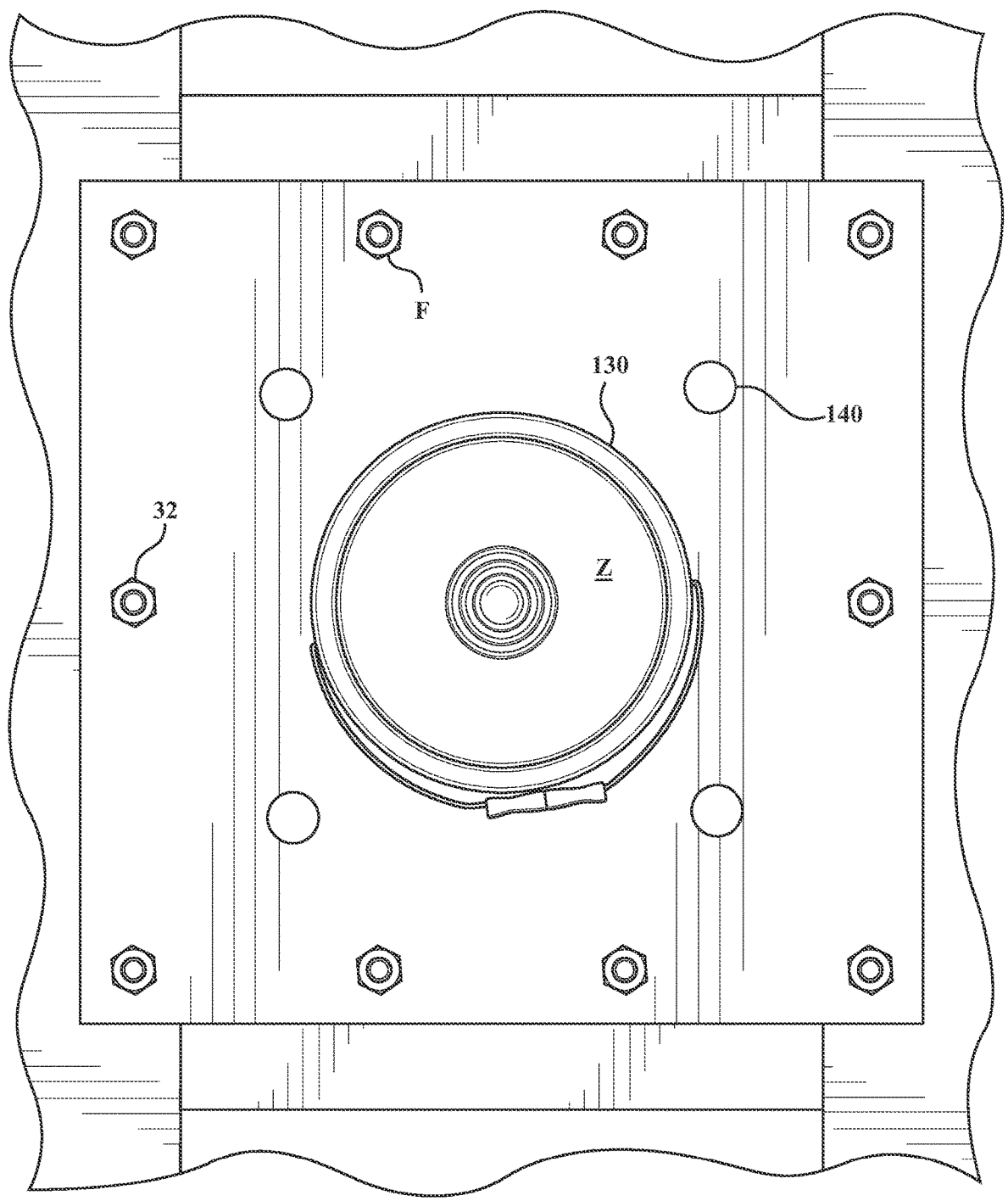
FIG. 12 is a perspective top view of an interface plate according to a disclosed non-limiting embodiment illustrating a bucket retained thereby.

The beams around the center compartment 86, (the second cross-beam 52, the third cross-beam 54, the first interface beam 60 and the second interface beam 62 supports the interface plate 26 (FIG. 12). The flanges around the center compartment 86 include the ballast tray assembly aperture arrangement 32, here shown as ten apertures, which correspond to the interface plate aperture arrangement 30. The interface plate 26 is attached via the ballast tray assembly aperture arrangement 32 and the interface plate aperture arrangement 30 with a multiple of fasteners F (FIG. 12).

With reference to FIG. 12, the interface plate 26 includes the mount aperture arrangement, here shown as four apertures, within the interface plate aperture arrangement 30. A central aperture 130 is located at the center of the interface plate 26 and within the mount aperture arrangement. The central aperture 130 in the disclosed embodiment is sized to receive a container such as a bucket Z that contains the hardware, i.e., nuts, bolts, etc., for assembly of the lattice tower 24 to the interface plate 26. The storage of the bucket within the central aperture 130 facilitates transport and organization of ballast tray 22 and an associated interface plate 26 and hardware therefor.

In one example, per the TIA-222-G, Structural Standard for Antenna Supporting Structures and Antennas, Applicant has determined that the ballast tray 22 and the associated interface plate 26 effectively resists overturning and sliding for a 30 foot tall 6 inch square tubing and a 6 foot tall top pipe (FIG. 13).

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A ballast tray assembly, comprising:
a first side-beam;
a second side-beam parallel to the first side-beam; a first cross-beam between the first side-beam and the second side-beam and perpendicular thereto;
a second cross-beam between the first side-beam the second side-beam and perpendicular thereto;
a third cross-beam between the first side-beam and the second side-beam and perpendicular thereto;
a fourth cross-beam between the first side-beam and the second side-beam and perpendicular thereto;

a first interface beam and a second interface beam parallel to the first side-beam and the second side-beam between the second cross-beam and the third cross-beam to provide a support interface at a center of the ballast tray assembly, the support interface formed by a ballast tray assembly aperture arrangement through a plurality of flanges around a center compartment; a subfloor attached to the first side-beam, the second side-beam, the first cross-beam, the second cross-beam, the third cross-beam, the fourth cross-beam, the first interface beam, and the second interface beam; and an interface plate comprising a central aperture, a mount aperture arrangement, and an interface plate aperture arrangement, the central aperture located at a center of the interface plate at the center compartment, the mount aperture arrangement around the central aperture and within the interface plate aperture arrangement, the interface plate attachable to the support interface, the mount aperture arrangement specific to a lattice tower which is to be mounted to the interface plate.

2. The ballast tray assembly as recited in claim 1, wherein the first side-beam is a first side I-beam, the second side-beam is a second side I-beam, the first cross-beam is a first cross I-beam, the second cross-beam is a second cross I-beam, the third cross-beam is a third cross I-beam, and the fourth cross-beam is a fourth cross I-beam, each of the first, second, third and fourth cross I-beam comprises a flange with a profiled end to interface with the first side I-beam and the second side I-beam.

3. The ballast tray assembly as recited in claim 1, wherein the ballast tray assembly is 8.5 feet by 8.5 feet and 1 foot 4 inches tall, contains 3.1 cubic yards of concrete, and resists overturning and sliding for a 30 foot tall, 6 inch square tubing, lattice tower with a 6 foot tall top pipe mounted thereto.

4. The ballast tray assembly as recited in claim 1, wherein the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

5. The ballast tray assembly as recited in claim 1, wherein the ballast tray assembly forms a rectilinear arrangement with seven compartments.

6. The ballast tray assembly as recited in claim 5, wherein each of the seven compartments comprise a drain hole through the subfloor.

7. The ballast tray assembly as recited in claim 1, wherein the central aperture is sized to receive a container.

8. The ballast tray assembly as recited in claim 7, wherein the container comprises a bucket.

9. The ballast tray assembly as recited in claim 1, wherein the central aperture is sized to receive a bucket.

10. A ballast tray assembly for a lattice tower, comprising:
a first side I-beam;
a second side I-beam parallel to the first side I-beam;
a first cross I-beam welded between the first side I-beam and the second side I-beam and perpendicular thereto;
a second cross I-beam welded between the first side I-beam and the second side !-beam and perpendicular thereto;

a third cross I-beam welded between the first side I-beam and the second side I-beam and perpendicular thereto;
a fourth cross I-beam welded between the first side I-beam and the second side I-beam and perpendicular thereto, wherein the first cross I-beam, the second cross I-beam, the third cross I-beam, and the fourth cross I-beam each include profiled ends to interface with the first side I-beam and the second side I-beam;

a first interface beam and a second interface beam parallel to the first side I-beam and the second side I-beam welded between the second cross I-beam and the third cross I-beam to provide a support interface at a center of the ballast tray assembly, the support interface formed by flanges of the I-beams around a center compartment, the flanges comprise a ballast tray assembly aperture arrangement;

a subfloor attached to the first side I-beam, the second side I-beam, the first cross !-beam, the second cross I-beam, the third cross I-beam, the fourth cross I-beam, the first interface beam, and the second interface beam; and an interface plate comprising a central aperture, a mount aperture arrangement, and an interface plate aperture arrangement, the central aperture located at a center of the interface plate at the center compartment, the mount aperture arrangement around the central aperture and within the interface plate aperture arrangement, the interface plate attachable to the support interface, the mount aperture arrangement specific to a lattice tower which is to be mounted to the interface plate.

11. The ballast tray assembly as recited in claim 10, wherein the interface plate is welded to the support interface.

12. The ballast tray assembly as recited in claim 10, wherein the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

13. The ballast tray assembly as recited in claim 12, wherein the ballast tray assembly is 8.5 feet by 8.5 feet and 1 foot 4 inches tall.

14. The ballast tray assembly as recited in claim 13, wherein the ballast tray assembly resists overturning and sliding for a 30 foot tall, 6 inch square tubing, lattice tower with a 6 foot tall top pipe mounted thereto.

15. The ballast tray assembly as recited in claim 14, wherein the ballast tray assembly is sized to contain 3.1 cubic yards of concrete.

16. The ballast tray assembly as recited in claim 15, further comprising a first routing aperture though the fourth cross I-beam and a second routing aperture through the third cross I-beam.

17. The ballast tray assembly as recited in claim 16, further comprising a pad eye mounted to a lower flange adjacent each corner of the ballast tray.

18. The ballast tray assembly as recited in claim 16, wherein the first routing aperture and the second routing aperture are 4 inches in diameter through which is mounted a pipe.

19. The ballast tray assembly as recited in claim 10, further comprising a container removably stored within the central aperture.

\* \* \* \* \*